J. A. BEDDINGFIELD.
AUTOMOBILE TIRE RIM.
APPLICATION FILED SEPT. 26, 1919.
1,345,659.
Patented July 6, 1920.
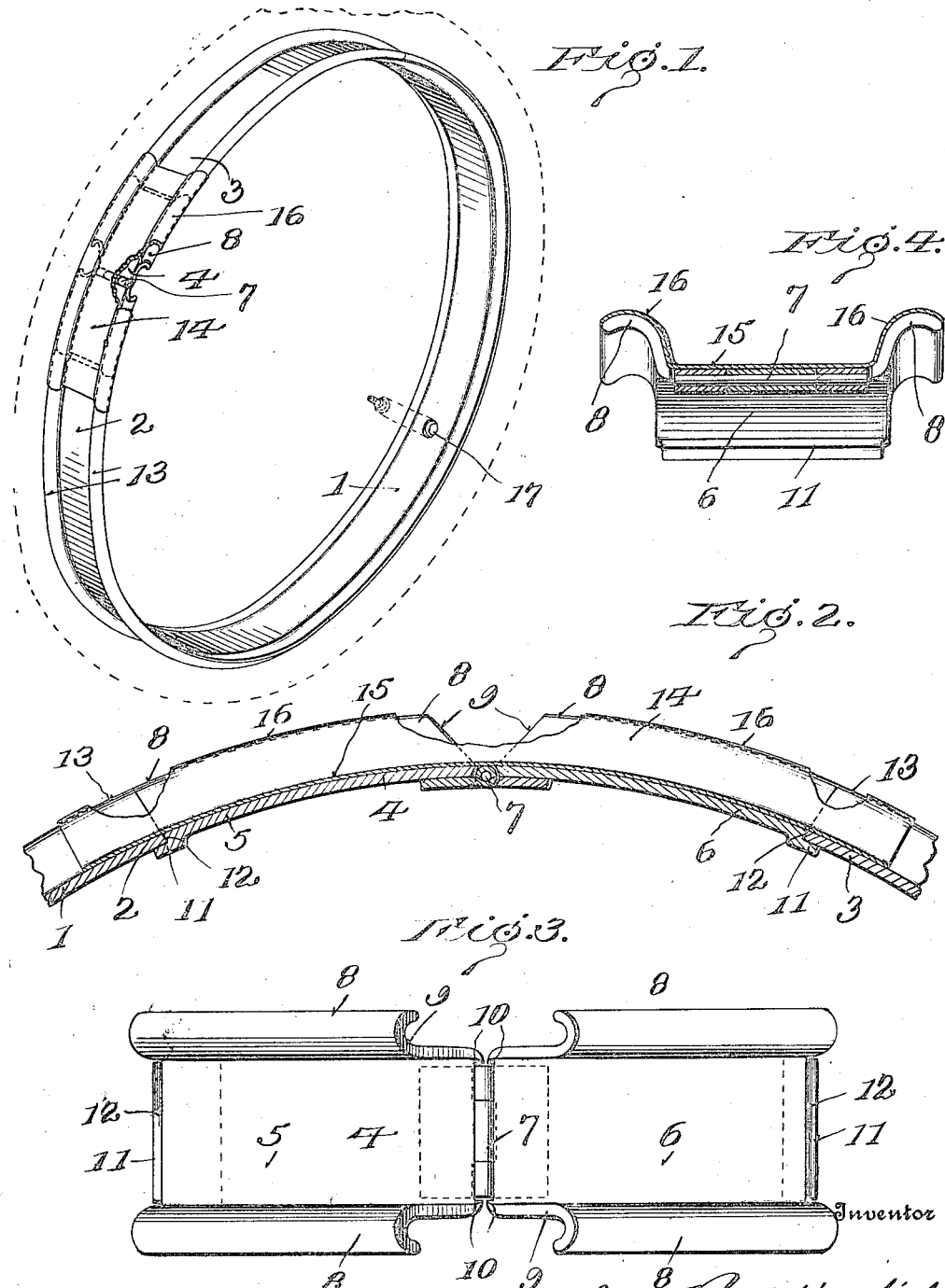

UNITED STATES PATENT OFFICE.

JOHN A. BEDDINGFIELD, OF MACON, GEORGIA, ASSIGNOR OF ONE-HALF TO R. DOUGLAS FEAGIN, OF MACON, GEORGIA.

AUTOMOBILE-TIRE RIM.

1,345,659.  Specification of Letters Patent.  Patented July 6, 1920.

Application filed September 26, 1919. Serial No. 326,584.

*To all whom it may concern:*

Be it known that I, JOHN A. BEDDINGFIELD, a citizen of the United States, residing at Macon, in the county of Bibb and State of Georgia, have invented certain new and useful Improvements in Automobile-Tire Rims, of which the following is a specification, reference being had to the accompanying drawing.

This invention relates to improved rims for use in connection with automobile tires and has for an object the production of a supporting rim upon which the usual pneumatic tire can be easily and accurately positioned or removed as occasion may require.

In practice at the present time, the tire is usually pried on or off of the rim, the beads of the outer casing being stretched over the flanges of the rim with difficulty in a large majority of cases. Certain attempts have been made to overcome the difficulties now experienced, and numerous sectional rims provided with hinged collapsible sections have been designed as the result.

The present invention embodies an improved rim construction wherein a hinged or collapsible member is detachably associated with a relatively non-collapsible portion of the rim.

An object of the present invention is the production of a simple, durable and inexpensive rim possessing advantages in practical use such as rapid and at the same time comparatively easy change of the tire.

Another object of the invention is to produce a rim of the character described in which the rigidity and strength of the rim is maintained.

With these and other objects in view the invention further consists in the construction and arrangement of the several parts set forth herein and particularly pointed out in the appended claims.

In the drawings which illustrate an embodiment of my invention:—

Figure 1 is a perspective view of the improved rim showing the tire in dotted lines and with certain parts broken away;

Fig. 2 is an enlarged sectional view of the collapsible hinged or toggle member as associated with portions of the relatively non-collapsible rim section;

Fig. 3 is an enlarged plan view of the collapsible hinged or toggle member; and

Fig. 4 is a detail, transverse, sectional view through the hinge of the collapsible member.

Generally stated, the construction comprises among other things a relatively permanent or non-collapsible rim section, a collapsible hinged or toggle member adapted to be set into an open portion of the aforesaid non-collapsible rim section for completing the rim, and a protecting strip or shoe associated with both of the aforesaid rim sections.

Referring to the drawings, the relatively permanent or non-collapsible rim section 1 is provided with an opened segmental portion between the ends 2 and 3 thereof for the reception of the collapsible rim section 4 formed of hinged members 5 and 6 and arranged to be forced into position as clearly shown in Fig. 2. The respective ends 2 and 3 of the non-collapsible rim section 1 are preferably cut at an angle with respect to the radii of the wheel. The edges of the hinged members 5 and 6 are correspondingly cut, and the joint produced is one of rigidity and permanency equal in tire supporting strength to the uncut rim now in use.

The degree of the angle may vary according to the length of the collapsible segmental portion of the rim, and I do not limit myself to the exact showing set forth. Likewise, the spring-like tendency manifested by the ends 2 and 3 of the non-collapsible section 1 when assembling the rim, may also vary according to the kind of metal used. The length of the hinged collapsible member 4 may vary, but in each instance it is designed to a length corresponding to the cut-away portion between the ends 2 and 3 of the rim 1, so that a circumferential support is provided when the rim is assembled, and the tire positioned thereon. A pivotal connection or hinge 7 is designed to connect the members 5 and 6 at their intermediate meeting ends, and as shown, is arranged in a plane substantially corresponding to the base of the rim. Each leaf of the hinge 7 may be welded to the respective hinged members 5 and 6, or integrally formed therewith, as may be desired. The inner ends of the hinged members 5 and 6 terminate short of the hinge 7 and are free to swing about the hinge as shown. The annular side flanges 8 of the hinged members are preferably cut away at an angle as shown at 9, thereby facilitating the free movement of the hinged members 5 and 6 about the hinge 7. This angle may vary as will be understood, but in each instance it is desirable to cut the flanges 8 so that the cut edges will extend from substantially the center of the hinge upon each side thereof as shown at 10 in Fig. 3. By this construction the beads of the tire are given a maximum lateral support and any tendency of the collapsible member 4 to shift or move laterally will be prevented.

Upon the outer ends of the hinged members 5 and 6 are provided fastening devices or locking lugs 11, the extreme ends of which extend under the ends 2 and 3, respectively, of the non-collapsible rim section 1 as shown in Fig. 2, and form seats 12 into which the said ends 2 and 3 fit. The lugs 11 are made to preferably terminate at approximately the side flanges 8 as shown.

The side flanges 8 of the collapsible member 4 form separable adjacent continuations of the annular side flanges 13 of the non-collapsible rim 1, and the angle of the abutting ends of the flanges is substantially that of the collapsible and the non-collapsible rim sections.

Coöperating with the joint formed by the insertion of the collapsible member 4, is a protecting strip or shoe 14 preferably formed of thin metal, and having a base 15 and annular side flanges 16. The base 15 is designed to rest upon the tire supporting surface of the rim, completely covering the hinge 7 and the hinged members 5 and 6 and extending over the ends 2 and 3 of the non-collapsible rim as shown. The annular side flanges 16 cover the side flanges 8 of the collapsible member 4 bridging the cut-away portion of the flange at the hinge 7 and also extending over the flange 13 of the non-collapsible rim section. This shoe or thin strip of metal is arranged to receive the tire casing and protect the same from any irregularities of construction which may have a tendency to wear upon the said tire at the hinged or abutting edges. The shoe is snugly fitted over the aforesaid structure sufficiently tight to hold it in position.

Formed in the non-collapsible portion of the rim is the usual opening 12 through which the valve of the tire is inserted. In the present design I have provided this opening immediately opposite the open side of the rim so as to assure a definite means of locating the joint.

In use, the tire is put on by holding the non-collapsible rim in place and fixing the shoe over the opening between the ends 2 and 3, so as to project over the same for a distance of several inches. The tire is then placed upon the rim and the toggle or collapsible member 4 is fitted into place by inserting lugs 11 under the edges 2 and 3 of the non-collapsible rim 1. In this position the hinged members 5 and 6 of the toggle are extended as will be understood. Pressure is now applied to the collapsible member 4 and the hinged members 5 and 6 are gradually forced into place, completing the circumferential tire support of the rim. The edges of the ends 2 and 3 are thereby snugly secured into the seats 12. The pressure used in snapping the collapsible member in place may be applied by the foot or in any other suitable manner. The tube of the tire is now inflated and the rim forms a strong and durable support for the tire. To take off the tire, the tube is deflated and the collapsible section is taken out, thereby disassembling the rim, after which the tire can be easily taken off. The rim is made of malleable steel or any other approved material suitable for the purpose set forth.

Various changes in the form and arrangement of the several parts may be made without departing from the scope of my invention and I do not limit myself to the exact construction herein disclosed.

I claim:—

1. A tire supporting rim comprising a section having an open portion or gap therein, and a detachable rim section composed of relatively short sections hinged together at their meeting ends, said detachable rim section being arranged to operate as a toggle, and having free ends extending into and secured within the aforesaid open portion for completing the rim.

2. A tire supporting rim comprising a section having an open portion or gap therein, a detachable rim section composed of relatively short sections hinged together at their meeting ends to form a toggle and means for attaching the free ends of the relatively short sections within the aforesaid open portion for completing the rim when the toggle is expanded.

3. A tire supporting rim comprising a section having an open portion or gap therein, a detachable rim section composed of relatively short sections having their meeting ends hinged together at a point approximating the base of the rim to form an inwardly breaking toggle, and coacting devices provided on the free ends of said short sections and the rim for securing the detachable section within the aforesaid open portion for completing the rim.

In testimony whereof I affix my signature.

JOHN A. BEDDINGFIELD.